Patented Aug. 21, 1945

2,383,134

UNITED STATES PATENT OFFICE 2,383,134

PREPARATION OF SYMMETRICAL DIARYL HYDRAZINES

Harold T. Lacey, Plainfield, and Robert E. Brouillard, Somerville, N. J., assignors to American Cyanamid Company, New York, N. Y., a corporation of Maine No Drawing. Application September 18, 1943, Serial No. 502,977

2 Claims. (Cl. 260—569)

This invention relates to an improved process of preparing symmetrical diarylhydrazines.

Hydrazobenzene and substituted hydrazobenzenes, such as hydrazoanisole, hydrazotoluene and the like, are of great practical importance as the products can be rearranged to form benzidine or substituted benzidines which are important intermediates for the production of dis- and polyazo dyes. The most common process used in large scale commercial operations is to reduce nitrobenzene or the corresponding substituted nitrobenzenes with zinc and alkali. The process operates satisfactorily, but there is considerable waste and the operating conditions are not as smooth as could be desired. The production of hydrazobenzene is ordinarily assumed to proceed through several intermediates, one important intermediate being azoxybenzene which is further reduced to hydrazobenzene.

The present invention is based on an improved process which proceeds in two steps with different reaction conditions. In the first step nitrobenzene or the corresponding substituted nitrobenzene is reduced with a reducing sugar and caustic alkali to the azoxybenzene and in the second step the resulting azoxy compound is reduced to the hydrazobenzene by the addition of a relatively small amount of zinc, preferably zinc which has been activated, for example, by treatment with a small amount of dilute hydrochloric acid. An extremely smooth-running process is obtained with excellent yields, and the production cost can be kept below the customary process using a single zinc reduction from nitrobenzene all the way through to the hydrazobenzene.

While the advantages of reagent economy and smooth operation are obtained in the reduction of all of the ordinary nitrobenzenes, there is an additional advantage in the preparation of 2,2'-dichlorohydrazobenzene which process presents serious operating difficulties when zinc is used, as a thick almost unstirrable mass results. By the present process, however, the reaction mixture remains at all times of a viscosity which permits ready stirring.

The two steps of the present process may be combined in the case of some of the compounds and in other cases it may be desirable to precipitate the crude azoxybenzene after the end of the first step of the process and before it is further reduced with zinc to the hydrazo stage. The best compromise between yield and equipment output will be chosen in each case, and it is an advantage of the present invention that there is considerable flexibility in the details of the process steps.

The invention will be described in greater detail in connection with the following specific examples, the parts being by weight.

EXAMPLE 1

*Hydrazobenzene*

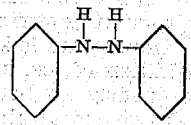

15 parts of sodium hydroxide are dissolved in 50 parts of water, 41 parts of nitrobenzene are added, and the mixture is heated to 55° C. with vigorous stirring. 45 parts of dextrose and 90 parts of a 50% aqueous sodium hydroxide solution are then added in alternate proportions over a considerable period of time while maintaining vigorous agitation. The additions of the dextrose and alkali bring about a color change of the reaction mixture from light yellow to orange.

After all of the dextrose and alkali has been added the temperature of the reaction mixture is raised to 105° C. and stirring continued at this temperature until the reaction is substantially complete. It is not necessary to isolate the azoxybenzene at this point but the temperature is lowered to 80° C., and 25 parts of zinc dust are slowly added. If the zinc is not active it may be activated by stirring for about a quarter of an hour with 100 parts of a 2% aqueous hydrochloric acid solution and washing three times by decantation. After all of the zinc dust has been added the temperature is raised to 85° C. and maintained at this temperature with vigorous stirring until a microscopic examination shows that all of the orange-red crystals have disappeared and the colorless hydrazobenzene crystals have formed.

This process gives an excellent yield of hydrazobenzene of good quality which can be rearranged into benzidine in the customary manner.

EXAMPLE 2

*2,2'-dichlorohydrazobenzene*

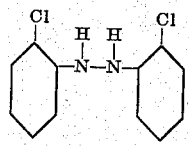

157.5 parts of orthonitrochlorbenzene and a solution of 135 parts of sodium hydroxide in 450 parts of water are heated to 55° C. 150 parts of dextrose are added slowly with vigorous stirring which causes the temperature to rise to 58-60° C. and changes the color of the mixture to brown. After all of the sugar has been added the reaction mixture is heated to 100° C. and maintained for about 5 hours at this temperature, after which unreacted orthonitrochlorbenzene and any orthochloraniline is removed by steam distillation. If desired, however, the steam-stripping may be omitted as the presence of these compounds does not exert any detrimental effect.

After steam distillation the reaction mixture is poured onto 600 parts of finely divided ice and the precipitated 2,2'-dichlorazoxybenzene is filtered and washed with 300 parts of water. The resulting presscake is then mixed with 20 parts of 50% aqueous sodium hydroxide solution and heated to 80° C. 60 parts of active zinc and 180 parts of a 10% aqueous sodium hydroxide solution are added in portions alternately over a period of several hours, while maintaining the temperature between 80 and 85° C. After all of the zinc and alkali has been added the reaction mixture is stirred for several additional hours at 80° C. and then poured onto 1,000 parts of ice and made acid to Congo red with 50% sulfuric acid while being vigorously stirred. During the acidification the temperature is kept between 10 and 15° C., by addition of ice, and the stirring is maintained for nearly an hour, keeping the mixture acid to Congo red at all times. A precipitate forms which is filtered and constitutes a presscake of 2,2'-dichlorohydrazobenzene in excellent yield which can be rearranged to 3,3'-dichlorobenzidine by conventional means.

The process may be carried out without isolating the azoxy compound in the following manner: 157.5 parts of o-nitrochlorobenzene are added to a solution of 10 parts caustic soda in 150 parts of water and the mixture is heated at 55°. Then 150 parts glucose and 425 parts of a 29.5 caustic soda solution are added in alternating portions over a period of one hour under vigorous stirring; the temperature goes up slightly to 60-65° and is eventually kept for five hours at 95°. The charge is cooled to 80° and then 60 parts zinc dust are added over a period of two hours. The heating is continued for two hours longer at 80-85°; then the charge is worked up as described above.

EXAMPLE 3

*2,2'-hydrazoanisole*

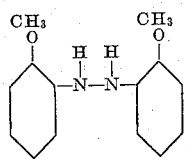

76.5 parts of orthonitroanisole are added to a solution of 67 parts of sodium hydroxide in 350 parts of water and the mixture heated to 50° C. 75 parts of dextrose are then added slowly with vigorous stirring which causes the temperature to rise to 60-65° C. and the color to change to red-brown. When all of the dextrose has been added the temperature of the reaction mixture is raised to 100° C. and the stirring is continued at this temperature until the reaction is substantially complete. The temperature is then lowered to 80° C. and 32 parts of active zinc are added slowly. After all the zinc has been added the temperature is raised to 90° C. and maintained at this temperature with vigorous stirring until the reduction to the hydrazo compound is complete. The reaction mixture is then filtered and washed with 200 parts of water. The press cake of 2,2'-hydrazoanisole can be rearranged to 3,3'-dianisidine by conventional means.

In the examples sodium hydroxide has been used as the alkali, as this is the cheapest caustic alkali available and as it gives excellent results it is preferred for economical reasons. However, the invention is in in sense limited thereto. On the contrary potassium hydroxide may be used with equal effect.

The dextrose is the cheapest and most readily available reducing sugar and gives excellent results. However, any other reducing sugars may be used if desired, such as invert sugar, fructose, xylose, mannose, galactose, etc.

We claim:

1. A method of producing 2,2'-dichlorohydrazobenzene which comprises reducing orthochlornitrobenzene to 2,2'-dichloroazoxybenzene by a reducing sugar and caustic soda and reducing the azoxybenzene thus prepared to 2,2'-dichlorohydrazobenzene by means of zinc and caustic soda.

2. A method according to claim 1 in which the sugar is dextrose.

HAROLD T. LACEY.
ROBERT E. BROUILLARD.